May 1, 1928.
H. E. SOMES
1,667,747
RELAY FOR ELECTRICAL CONTROL APPARATUS
Filed Oct. 19, 1923
2 Sheets-Sheet 1
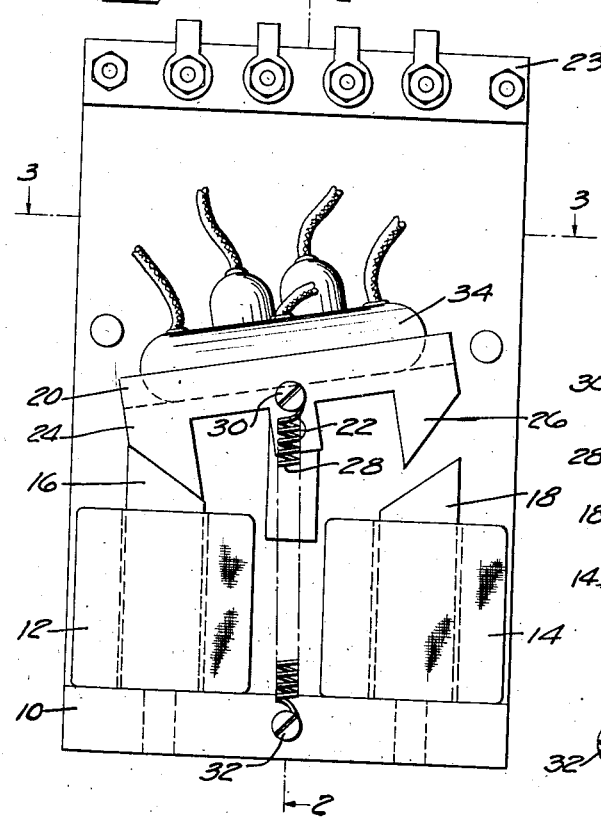
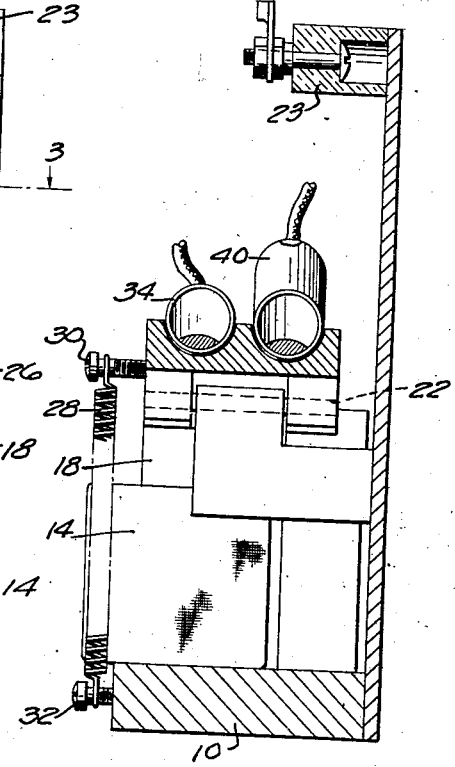
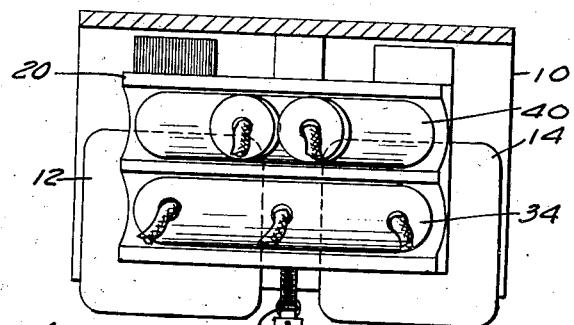
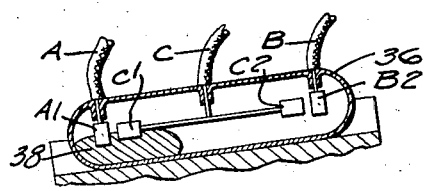
INVENTOR
Howard E. Somes
BY
H. H. Dyke
ATTORNEY

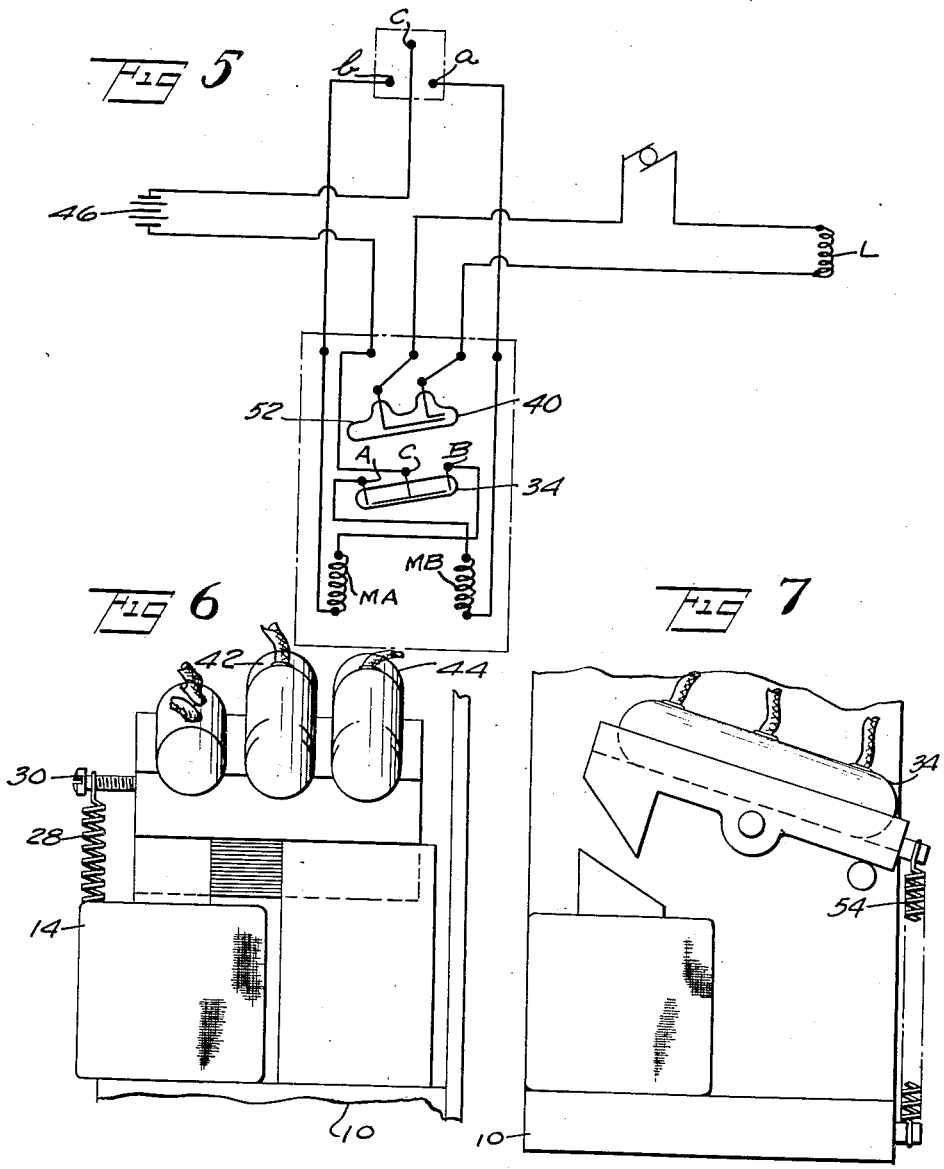

Patented May 1, 1928.

1,667,747

UNITED STATES PATENT OFFICE.

HOWARD E. SOMES, OF PHILIPSE MANOR, NEW YORK.

RELAY FOR ELECTRICAL CONTROL APPARATUS.

Application filed October 19, 1923. Serial No. 669,554.

My invention relates to relays for electrical control. Relays in accordance with the present invention are of use in many fields of application. One field of utility, which may be referred to by way of example, and for which apparatus embodying the principles of the present invention has been found to be well adapted, lies in the control of electrical current supplied to electrical heating devices used for baking enamel on automobile parts and the like. Such ovens may be held between given maximum and minimum temperatures by means of thermostatic instruments, and a relay of the present invention for controlling the electrical heating circuit. Other uses may be mentioned, as for control of heat treating ovens, lead baths, etc., but the relay of my invention is of general application and is in no way limited to the specific uses mentioned by way of illustration.

One of the objects of the present invention is the provision of apparatus making use of mercury switches and adapted to control any desired number of circuits without substantial increase in power required for operation over that required for the control of a single circuit.

Another object of the invention consists in the provision of an armature element or beam of relatively great mass, having a low natural period of oscillation and incapable of rapid oscillation or vibration, thereby avoiding injury not only to the relay, but to apparatus controlled thereby, as, for example, where the electrical current controlled is used for reversing the current supplied to an electric motor. Relays embodying vibratory control means of relatively rapid period of vibration are unsuitable for such uses and would speedily ruin a motor by subjecting same to unduly rapid reversals or other changes of current.

Another feature of the invention consists in the provision of magnet cores and armature parts of such form that a maximum range of movement of the armature may be obtained with a minimum of air gap.

Another object of the invention consists in the substantial reduction in number of moving parts as compared with prior practice and the simplification of the apparatus, whereby a simple and efficient form of apparatus is obtained, which gives good results and does not readily get out of order.

Other objects will be referred to in connection with the following description of an embodiment of the invention as shown for illustration in the accompanying drawings.

In said drawings, Fig. 1 is a front view of one form of apparatus embodying my invention. Fig. 2 is a vertical sectional view on line 2—2, Fig. 1. Fig. 3 is a horizontal sectional view on the line 3—3, Fig. 1. Fig. 4 is a longitudinal section of a double ended electrical switch of the mercury type. Fig. 5 is a wiring diagram. Fig. 6 is a view generally similar to Fig. 2, and showing a modified form in which a plurality of load control switches are used, and Fig. 7 is a view similar to a part of Fig. 1, and showing a modification in which one magnet and its core are replaced by a spring.

Reference numeral 10 is used to designate any suitable base, stand or support for the parts, which, in the form shown, comprise in the main a pair of stationary magnets 12, 14 having the bevel-ended cores 16, 18, and the relatively heavy armature beam 20 arranged to rock or oscillate adjacent to, preferably above, the magnets 12, 14, upon a suitable pivotal support, such as the shaft 22. A shelf or bracket 23 of insulating material may be provided for carrying binding posts, etc. The poles 24, 26 of the armature are preferably beveled as shown, thereby in conjunction with the beveled cores 16, 18 permitting a maximum rocking movement of the rocking member 20, while at the same time insuring that the air gap between the magnet cores and the armature poles does not become unduly great, as would be the case, for example, if both the poles of the armature and the magnet cores were cut square off.

Means are preferably provided for insuring that the rocker member or beam 20 shall not stop when on or near a dead center and, in the form shown, a spring 28 is provided for this purpose, being attached to the rocker arm as by screw 30 located above the point of pivotal support of the rocker arm and to base 10 below such point of pivotal support, as at 32.

The relay switch 34 is carried by the rocker arm 20 and partakes of its rocking movement. This switch is preferably of the construction shown in Fig. 4, comprising a tube 36 of glass, in which is received a quantity of mercury 38, and is of relatively much smaller mass than the rocker 20 on which it is mounted and which, as already stated, is of relatively great mass. In the form of switch shown three wire connections A, B and C are provided, the middle one C thereof being branched to include the contact members C¹ and C², whereby either of the lines A and B may be electrically connected to the common line C, as by including switch parts A¹ and C¹ within the common body of mercury 38, or when the switch is tilted to the other position, by including the contact members B² and C² within the same body of mercury 38.

The same rocker arm 20 which carries the relay switch 34 also carries one or more load control switches for controlling the circuit including load L. In Fig. 2 I have shown a single load control switch 40, and in Fig. 6 I have shown two load control switches 42 and 44, but it is to be understood that any number of balanced load control switches may be used, as may be desired, all operated by the same relay.

The circuit arrangement is such that the passage of actuating current through a relay coil is of but momentary duration and is automatically broken by the movement of the relay switch produced by the coil thus energized, and together with such breaking of this circuit, the beam or rocker arm is moved to a position whereby when a new contact is made in the actuating instrument, current will pass through the other coil to energize same, upon which this relay circuit is in turn immediately broken, and this operation repeated indefinitely. One way in which provision may be made for securing the results just stated is illustrated in the wiring diagram of Fig. 5. In this view $a$, $b$ and $c$ represent the contact members of any form of thermostatic or other control instruments of standard make. Such apparatus being well known, does not require illustration in the present connection. Where such devices are used for controlling maximum and minimum temperatures, for example, the arrangement is as follows: C and $c$ are connected together, current being taken from any suitable source, as a line wire or the battery 46 indicated for simplicity of showing. A is connected to $a$ through the magnet coil MB and B is connected to $b$ through the magnet coil MA.

There are thus two places in each branch of the circuit where same may be closed or broken, one from $a$ or $b$ to $c$, and the other from A or B to C. In order for current to flow in either branch both sets of contacts in such branch must be in closed position.

Assuming contact made from A to C, as in the position shown in Fig. 5, current will flow in this branch as soon as the instrument contact $a$ to $c$ is made due, for example, to the temperature in the controlled device falling to a given minimum point. This completes the circuit through this branch, including coil MB. Coil MB being thus energized, rocks the rocker arm on its pivot, with three results; one, the circuit which has just been closed at $ac$ is opened at AC, two, contact is made from B to C, and, three, the control switch 40 is operated to impose any desired change upon the circuit or circuits controlled by the relay. This leaves the relay switch with contact made from B to C, and this branch of the circuit ready for current passage from $b$ to $c$, which in the case referred to will take place when the temperature of the controlled device rises to a given point, thus completing the circuit in this branch, energizing coil MA and rocking the rocker arm back into the position indicated in Fig. 5, with any suitable resultant change in the controlled switch 40, as, for example, in the form indicated in Fig. 5, the controlled circuit will be broken. Such operation is repeated indefinitely.

When a plurality of load control switches is provided (two are indicated in Fig. 6), practically any number of such switches can be operated by the rocker arm without any additional power being used for its actuation, and practically any desired arrangements for load connections and opening and closing, or otherwise controlling load circuits may be obtained.

It is to be understood that the embodiment of the invention shown is for illustration only and not for limitation of the invention, and that a variety of changes, such for example, as the substitution of a spring 54 for one of the magnets as shown in Fig. 7, and various other changes and modifications may be resorted to within the scope of my claims, and without departing from my invention.

I claim:

1. In an electrical relay, an electro-magnet adapted to be intermittently energized, a rocking armature beam member pivoted to rock about an axis below the center of gravity thereof and adapted to be actuated by said magnet, said armature member being relatively heavy and massive and of a low natural period of oscillation, and a circuit making and breaking mechanism to be controlled by said electro-magnet including one or more mercury switches of relatively much smaller mass than the armature beam member and mounted on and carried by the latter.

2. In an electrical relay, a pair of solenoids having cores with suitably shaped pole faces and adapted to be intermittently and alternately energized, an armature beam member pivoted intermediate its ends for rocking movement about an axis below the center of gravity thereof into engagement with the core pole faces and being of a relatively heavy, massive construction and of low natural period of oscillation, and a circuit mechanism including one or more relay switches of relatively smaller mass mounted on said armature member and carried thereby.

3. In an electrical relay, a pair of solenoids having cores with suitably shaped pole faces and adapted to be intermittently and alternately energized, a rocking armature beam member of inverted U form having its legs shaped to form pole faces corresponding to the pole faces of the cores and pivoted for rocking movement about an axis below the center of gravity thereof, said armature member being of a relatively heavy massive construction and of a low natural period of oscillation, a spring for biasing the armature past the dead center in either direction, and a circuit mechanism including one or more relay switches mounted on said armature member and carried thereby.

In testimony whereof, I have signed my name hereto.

HOWARD E. SOMES.